(12) United States Patent
Burke et al.

(10) Patent No.: US 7,898,405 B2
(45) Date of Patent: Mar. 1, 2011

(54) VEHICLE INFORMATION DISPLAY AND METHOD

(75) Inventors: Stephen Richard Burke, Triadelphia, WV (US); Angela L. Watson, Ann Arbor, MI (US); David Leslie Watson, Ann Arbor, MI (US); Michael Scott Lerman, Dearborn, MI (US); Ryan J. Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 12/054,822

(22) Filed: Mar. 25, 2008

(65) Prior Publication Data

US 2009/0243827 A1  Oct. 1, 2009

(51) Int. Cl.
*B60Q 1/00* (2006.01)

(52) U.S. Cl. .............. 340/461; 180/65.21; 180/65.265; 340/425.5; 340/438; 340/636.1; 701/22; 903/903; 903/918

(58) Field of Classification Search .............. 340/425.5, 340/438–439, 455–462, 636.1–636.19; 701/22, 701/29, 70, 123; 180/65.265, 65.21; 903/903, 903/918, 951; 307/43; 324/76.11
See application file for complete search history.

(56) References Cited

U.S. PATENT DOCUMENTS

| | | | |
|---|---|---|---|
| 2,685,198 | A | 8/1954 | Saul, Sr. |
| 3,263,503 | A | 8/1966 | White |
| 3,977,238 | A | 8/1976 | Byington, Jr. |
| 4,113,046 | A | 9/1978 | Arpino |
| 4,463,427 | A | 7/1984 | Bonnetain et al. |
| 6,092,021 | A | 7/2000 | Ehlbeck et al. |
| 6,278,916 | B1 | 8/2001 | Crombez |
| 6,352,318 | B1 | 3/2002 | Hosomi et al. |

(Continued)

FOREIGN PATENT DOCUMENTS

DE  3521363  1/1986

(Continued)

OTHER PUBLICATIONS

Article entitled "Brake/Eng Run Kit", [Online] [Retrieved on Feb. 19, 2007]; Retrieved from http://www.coastaletech.com/brake.htm, 3 pages.

(Continued)

*Primary Examiner*—Brent Swarthout
(74) *Attorney, Agent, or Firm*—David B. Kelley; Brooks Kushman P.C.

(57) ABSTRACT

An information display for a vehicle includes an indicator arrangement having a visual display configured to provide driver demand information to a vehicle driver. The visual display includes a dynamic target range for operating the vehicle, which includes a first boundary and a second boundary indicating a driver demand that would cause the engine to start. A control system includes at least one controller, and is configured to receive at least one input related to current operating conditions of the vehicle and to provide at least one output to the indicator arrangement to position the target range on the visual display and to indicate to the driver a current level of driver demand. In this way, the visual display indicates to the driver the current level of driver demand relative to the position of the target range.

16 Claims, 3 Drawing Sheets

U.S. PATENT DOCUMENTS

| | | |
|---|---|---|
| 6,411,888 B1 | 6/2002 | Weisman, II |
| 6,480,106 B1 * | 11/2002 | Crombez et al. ............ 340/461 |
| 6,600,413 B1 | 7/2003 | Lo |
| 6,751,534 B2 | 6/2004 | Robichaux et al. |
| 6,794,853 B2 | 9/2004 | Kondo |
| 7,013,205 B1 * | 3/2006 | Hafner et al. ................. 701/22 |
| 7,024,306 B2 | 4/2006 | Minami et al. |
| 7,091,839 B2 | 8/2006 | Situ et al. |
| 7,726,255 B2 | 6/2010 | Nakamichi |
| 2005/0128065 A1 * | 6/2005 | Kolpasky et al. ............ 340/461 |
| 2007/0203625 A1 | 8/2007 | Quigley et al. |
| 2007/0208468 A1 * | 9/2007 | Sankaran et al. .............. 701/29 |
| 2008/0059035 A1 * | 3/2008 | Siddiqui et al. ............... 701/93 |

FOREIGN PATENT DOCUMENTS

| | | |
|---|---|---|
| JP | 7315078 | 12/1995 |
| JP | 10129298 | 5/1998 |
| JP | 2004290000 | 10/2004 |
| WO | 2006001809 A1 | 1/2006 |
| WO | 2006085193 A1 | 8/2006 |

OTHER PUBLICATIONS

Article entitled "Lexus RX 400h Hybrid Overview", [Online] [Retrieved on Feb. 19, 2007]; Retrieved from http://www.lexus.com/pdf/models/rxh_driving_performance_guide.pdf, 31 pages.

* cited by examiner

US 7,898,405 B2

VEHICLE INFORMATION DISPLAY AND METHOD

BACKGROUND OF THE INVENTION

1. Field of the Invention

The present invention relates to an information display for a vehicle and a method for displaying vehicle information, and in particular, information related to a target driver demand and a current driver demand.

2. Background Art

All vehicles, whether passenger or commercial, include a number of gauges, indicators, and various other displays to provide the vehicle operator with information regarding the vehicle and its surroundings. With the advent of new technologies, such as hybrid electric vehicles (HEV's), has come a variety of new gauges and information displays that help drivers to better learn the operation of these vehicles that utilize new technology. For example, many HEV's incorporate gauges that attempt to provide the driver with information on the various hybrid driving states. For example, some gauges will indicate to the driver when the vehicle is being propelled by the engine alone, the motor alone, or a combination of the two. Similarly, a display may indicate when the motor is operating as a generator, and is recharging an energy storage device, such as a battery.

With regard to HEV's, it is known that some drivers may not be able to achieve desired fuel economy numbers, in part because of driving habits. In many cases, drivers are willing to modify their behavior, but are unable to translate recommended techniques into real changes in their driving habits. Moreover, gauges or displays that merely indicate when the engine is on or off, provide information that is not timely—i.e., once the indicator signals that the engine is on, it is too late for the driver to modify his or her driving to keep the engine off.

Therefore, a need exists for an information display for a vehicle, and a method for displaying such information, that provides information that will help a driver increase fuel economy by indicating a relationship between a driver demand and an engine-on event, thereby facilitating economical driving choices by a driver.

SUMMARY OF THE INVENTION

Embodiments of the present invention provide an information display to a vehicle operator that indicates a relative driver demand and its relationship to an engine-on event. Some embodiments may display a driver demand for power relative to a target range for demanded power; others may display driver demanded torque or speed, or may indicate driver demand based on another factor or factors, such as an accelerator pedal position. In this way, drivers can see how changing their demand for power (or torque, etc.) may cause the engine to start or be shut off. They can then make informed decisions as to how to operate the vehicle.

The target range for demanded power may change with changing vehicle conditions. For example, when an electric power source—e.g., a battery, fuel cell, capacitor, etc.—can provide a relatively large amount of power to an electric motor, the target range for demanded power may be changed upward. That is, the point at which driver demand causes the engine to start may move to a higher power level, since the motor can supply more of the driver demand. The point of driver demanded engine start may be an upper limit on the target range, which may have a lower limit at zero power demand.

In some situations, an engine may need to run to provide power to vehicle electrical loads, especially in the case of systems and devices that consume large amounts of power—e.g., air conditioning systems. In such cases, lowering driver demand may not be enough to cause the engine to shut off. In some embodiments of the invention, the target range may not be displayed in these situations; this provides an indication to the driver that reducing driver demand will not be enough to effect engine shutoff.

HEV's may include both a friction braking system and a regenerative braking system wherein braking energy is captured and stored as electrical energy. Some embodiments of the invention may indicate when the friction braking system is engaged, thereby providing the driver with information to modify his or her driving behavior for increased economy. In these embodiments, the amount of negative driver demand—e.g., power, torque, etc.—can be indicated relative to the point at which friction braking will begin. The point at which driver demand causes friction braking to begin may be indicated as part of a target range for negative driver demand.

In some cases, friction braking may be the result of something other than driver demand, for example, if a battery state of charge is above a predetermined threshold, friction braking may be used. In such a case, the target range for negative driver demand may not be displayed. When the target range for negative driver demand is displayed, it may also be a dynamic range, having a movable position on the display based on current vehicle operating conditions. For example, as the state of charge of a battery increases, the target range may decrease in size—e.g., the point which friction braking begins may move to a lower (less negative) power value.

Embodiments of the invention may also include an information display for a vehicle including an engine and an electric machine, each operable to provide torque to propel the vehicle. The vehicle further includes an electric power source configured to provide electric power to the electric machine. An indicator arrangement includes a visual display configured to provide driver demand information to a driver of the vehicle, and includes a dynamic target range for operating the vehicle. The target range includes a first boundary and a second boundary indicating a driver demand that would cause the engine to start. A control system includes at least one controller, and is configured to receive at least one input related to current operating conditions of the vehicle, and to provide at least one output to the indicator arrangement to position the target range on the visual display and to indicate to the driver a current level of driver demand. In this way, the visual display indicates to the driver the current level of driver demand relative to the position of the target range.

Some embodiments of the invention may include an indicator arrangement including a visual display configured to provide information indicative of a driver demand for power. The visual display includes a target range for operating the vehicle that has a movable boundary indicating a driver demand that would cause the engine to start. A control system is configured to position the movable boundary and a current level of driver demand on the visual display such that the position of the movable boundary relative to the current level of driver demand is observable.

Embodiments of the invention also include a method for providing information to a driver of a vehicle having an engine and an electric machine, each operable to provide torque to propel the vehicle. The vehicle further includes an electric power source configured to provide electric power to the electric machine. The method includes the steps of determining at least one current operating condition of the vehicle, and determining a first driver demand threshold beyond which the engine will start. The determination of the first driver demand threshold is based on the at least one current operating condition. The method further includes the steps of displaying the first driver demand threshold, determining current driver demand information, and displaying the current driver demand information relative to the displayed first driver demand threshold.

DETAILED DESCRIPTION OF EMBODIMENTS OF THE INVENTION

Figure 1:
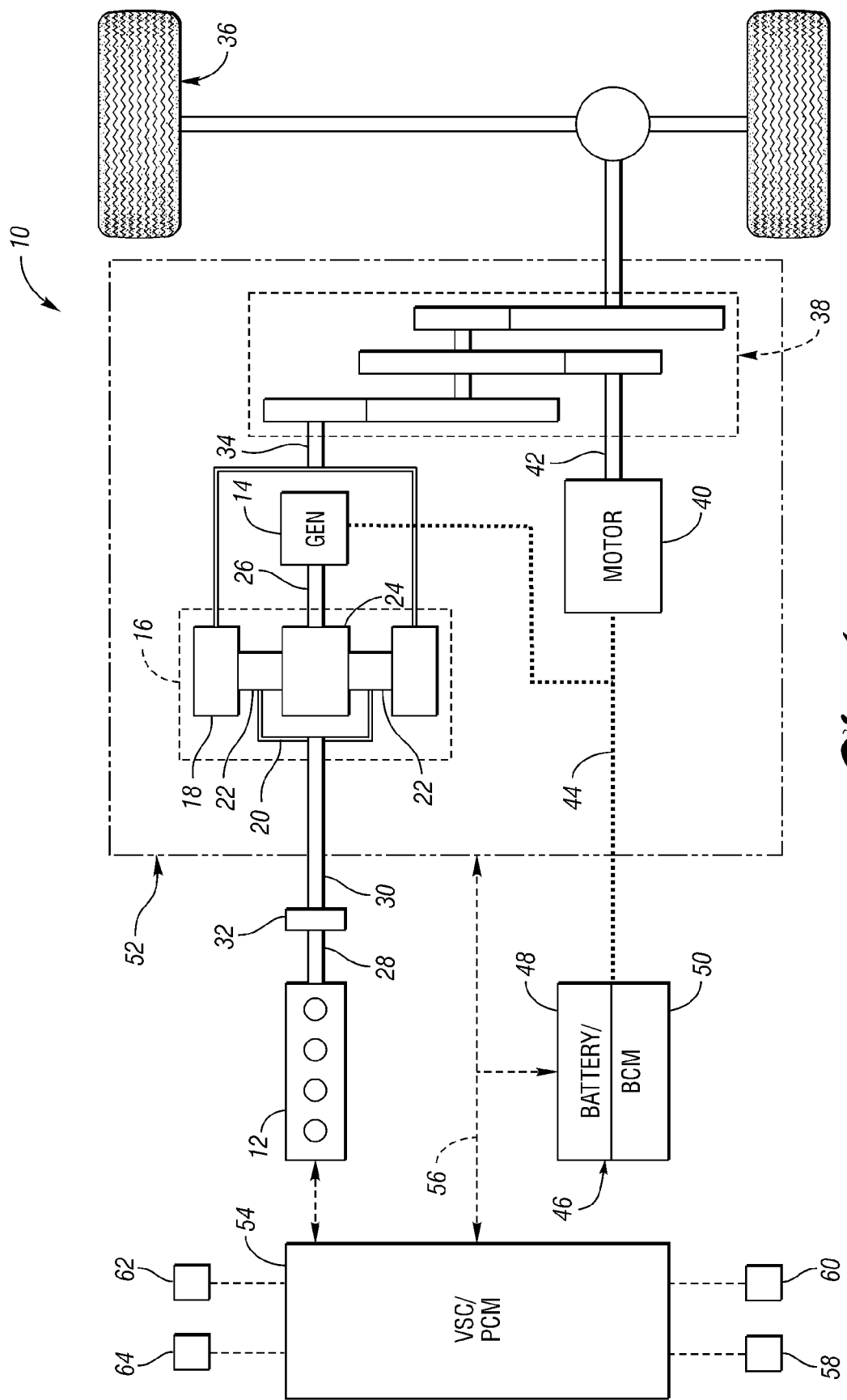
FIG. 1 shows a schematic representation of a hybrid electric vehicle including an information display in accordance with one embodiment of the present invention.

FIG. 1 shows a schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 48—i.e., the generator 14 and motor 40—a vehicle control system, shown generally as controller 54, is provided. As shown in FIG. 1, the controller 54 is a vehicle system controller/powertrain control module (VSC/PCM). Although it is shown as a single controller, it may include multiple controllers. For example, the PCM portion of the VSC/PCM 54 may be software embedded within the VSC/PCM 54, or it can be a separate hardware device.

A controller area network (CAN) 56 allows the VSC/PCM 50 to communicate with the transmission 52 and the BCM 50. Just as the battery 48 includes a BCM 50, other devices controlled by the VSC/PCM 54 may have their own controllers. For example, an engine control unit (ECU) may communicate with the VSC/PCM 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present invention. Although illustrated and described in the context of the vehicle 10, which is an HEV, it is understood that embodiments of the present invention may be implemented on other types of vehicles, such as those powered by an engine or electronic motor alone.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, communicate with the VSC/PCM 54.

The air conditioning system 62 also communicates with the VSC/PCM 54. The on/off status of the air conditioning system can be communicated to the VSC/PCM 54, and can be based on, for example, the status of an operator actuated switch, or the automatic control of the air conditioning system 62 based on related functions such as window defrost. In addition to the foregoing, the vehicle 10 includes an information display 64, which, as explained in detail below, provides driver demand information to an operator of the vehicle 10.

Figure 2:
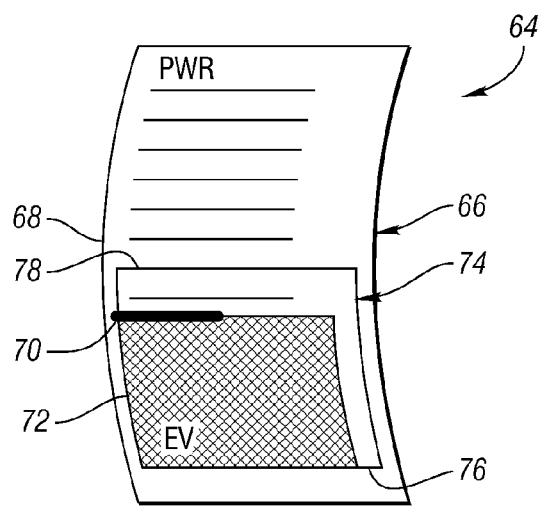
FIG. 2 shows in detail the information display shown in FIG. 1.

FIG. 2 shows the information display 64 in detail. The information display 64 includes an indicator arrangement 66, which may include such things as a visual display 68, and electronics, including software, which are not shown in FIG. 2. The visual display 68 provides information to an operator of the vehicle 10 that is indicative of a driver demand for power. As shown in FIG. 2, the visual display 68 uses units of power (PWR), which may be, for example, in kilowatts (kW). Other types of measurements are also indicative of a driver demand for power, for example, a driver demand for torque, a driver demand for speed, or even a position of the accelerator pedal 60.

In addition to the indicator arrangement 66, the information display 64 also includes a control system, which, for reference purposes, may be considered the VSC/PCM 54 shown in FIG. 1. The VSC/PCM 54 is configured to receive inputs related to current operating conditions of the vehicle 10, and to provide outputs to the indicator arrangement 66 such that the visual display 68 indicates to the vehicle operator a current level of driver demand and a target range in which it is desirable for the driver to operate the vehicle. In FIG. 2, the current level of driver demand is indicated by the "bubble" 70. Although it is referred to as a bubble, it may actually be a light emitting diode (LED) or other form of indicator. Below the bubble 70 is a shaded region 72, which helps the driver to see the position of the bubble 70. The shaded region 72 may be in one or more colors that are readily discernable by the driver. Also shown on the visual display 68 is a target range 74 for the driver demand. As explained more fully below, it may be desirable for the driver to operate the vehicle 10, such that the current driver demand 70 stays within the target range 74.

The target range 74 is dynamic, in that its size and position on the visual display 68 may be different during different operating conditions of the vehicle 10. The target range 74 includes a first boundary 76, and a second boundary 78. The second boundary 78 indicates a level of driver demand that would cause the engine 12 to start. Thus, in FIG. 2, where the bubble 70 is within the target range 74, the letters "EV", for electric vehicle mode", are visible. Similar to the bubble 70, the position of which will move as driver demand changes, the position of the second boundary 78 of the target range 74 will also move, depending on current operating conditions of the vehicle 10.

Figure 3:
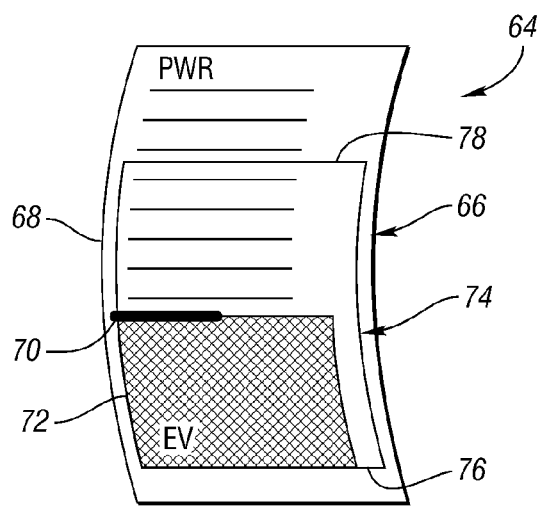
FIG. 3 shows the information display of FIG. 2 with one of the boundaries in a different position.

FIG. 3 shows the information display 64 having a larger target range 74 than shown in FIG. 2. In particular, the first boundary 76 is in the same position in both examples; however, the second boundary 78 is repositioned to a higher driver demand level in FIG. 3. As noted above, the position of the second boundary 78 is dependent upon current vehicle operating conditions. For example, if a state of charge of the battery 48 is relatively low, a relatively modest increase in driver demand may cause the engine 12 to start. This situation, illustrated in FIG. 2, results from a need to recharge the battery 48 by running the engine 12 to operate the generator 14. Conversely, if the battery 48 has a relatively high state of charge, the motor 40 may be able to operate the vehicle 10 even where the driver demands a relatively high level of power; this situation is illustrated in FIG. 3. Another vehicle operating condition that can affect the size of the target range 74, and in particular, the position of the second boundary 78, is a discharge rate for the battery 48. For example, if electrical loads in the vehicle 10 are relatively high, the battery 48 may be quickly discharging, which could cause the boundary 78 to be moved to a lower power level.

Figure 4:
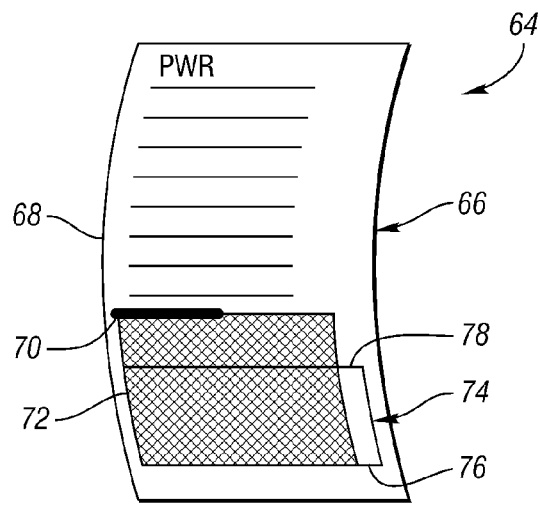
FIG. 4 shows the information display of FIG. 2 with the boundary in a third position.

When the driver demand exceeds the second boundary 78, the engine 12 will start. This situation is shown in FIG. 4. In each of the examples illustrated in FIGS. 2-4, the position of the bubble 70, representing a current level of driver demand, is shown on the visual display 68 relative to the position of the target range 74 so that a driver can see the effect of changing his or her demand for power. For example, if the information display 64 appears as shown in FIG. 2, a driver will know that a relatively modest increase in driver demand will cause the engine 12 to start. After the increase in driver demand, the information display 64 may appear as illustrated in FIG. 4, where the bubble 70 exceeds the level of the second boundary 78.

As discussed above, the situation illustrated in FIG. 4 can also be caused by a change in the target range 74, for example, because of a reduced state of charge of the battery 48. When presented with an information display 64, such as shown in FIG. 2, a driver may choose not to increase driver demand until current vehicle operating conditions increase the size of the target range 74. Thus, if current vehicle operating conditions provide a visual display 68, such as shown in FIG. 3, a driver may then choose to increase his or her power demand, knowing that the vehicle 10 may still be operated in an electric mode, propelled by the motor 40, without assistance from the engine 12.

Driver demand is not the only factor that may cause an engine in an HEV, such as the engine 12, to be turned on. If, for example, the air conditioning system 62 is operating, the engine 12 may remain on to ensure that the relatively high power consumption of the air conditioning system 62 does not unacceptably discharge the battery 48. In such a case, embodiments of the invention provide for the target range to not be displayed on the visual display 68, so that the vehicle operator will know that his or her driver demand is not controlling the engine-on function; this situation is displayed in FIG. 5.

In addition to illustrating a positive driver demand, embodiments of the present invention also provide information related to a negative power or other negative driver demand, which is related to vehicle braking. FIG. 6 shows an information display 80 in accordance with another embodiment of the present invention. The information display 80 includes an indicator arrangement 82, which may include such things as a visual display 84, and electronics, including software. In addition to the indicator arrangement 84, the information display 80 also includes a control system, such as the VSC/PCM 54 shown in FIG. 1. Similar to the information display 64 illustrated in FIGS. 1-5, the information display 80 provides information to a vehicle operator about a current level of driver demand relative to a target range.

The visual display 84 includes an indicator 86, which may be an analog indicator in the form of a needle, or it may be one or more LED's or other visual indicator. The driver demand is indicated on the visual display 84 as a driver demand for power, with units of kilowatts. As shown in FIG. 6, the visual display 84 provides a range of −26 kW to 26 kW, and it is understood that other power ranges may be displayed. Similar to the information display 64, illustrated and discussed above, the information display 80 may provide information that is indicative of a driver demand for power, such as a driver demand for torque or speed, or an accelerator pedal position.

The visual display 84 also includes a target range 88 for driver power demand. The target range 88 is bounded on one side by a first boundary 90, and on the other side by a second boundary 92. The portion of the target range 88 between 0 kW and the second boundary 92 is similar to the target range 74 illustrated in FIGS. 2-4. Specifically, this portion of the target range 88 indicates a driver demand for positive power, and the second boundary 92 indicates the point at which a driver demand will cause an engine, such as the engine 12 shown in FIG. 1, to start.

In addition to indicating the driver demand for positive power, the information display 80 also provides information related to a driver demand for negative power; this is information related to braking. Unlike the target range 74, which had a first boundary 76 fixed at a level of zero driver demand, the first boundary 90 on the visual display 84 is movable based on vehicle operating conditions. The first boundary 90 indicates the point at which a driver demand for negative power will exceed the capabilities of the regenerative braking system and cause a friction braking system to be engaged. When the indicator 86 is within the target range 88, and is between 0 and the first boundary 90, the driver demand for negative power is being satisfied by regenerative braking. This is a desirable state, and the driver can easily see when the vehicle is operating in this zone—e.g., see FIG. 7.

As the driver demands more negative power, that is, as braking becomes faster or more aggressive, the indicator 86 will approach the first boundary 90. The driver may than choose to reduce the demand for negative power to maintain the indicator 86 within the target range 88, and keep the friction braking system from engaging. Thus, the information display 80 shows a current driver demand for negative power with the indicator 86, relative to the target range 88, and in particular, the first and second boundaries 90, 92.

As described above, a control system, such as the VSC/PCM 54 may receive any number of inputs related to current vehicle operating conditions, and then provide one or more outputs to an indicator arrangement, such as the indicator arrangements 66, 82 illustrated in the drawing figures. Similar to the target range 74 illustrated in FIGS. 2-4, the target range 88 illustrated in FIGS. 6-7 is also movable, although both boundaries 90, 92 are movable based on the vehicle operating conditions. For example, it is shown in FIG. 7 that the second boundary 92 is closer to a zero power demand then it is in FIG. 6. This would indicate a reduced state of charge for a battery, such as the battery 48 shown in FIG. 1.

The reduced state of charge of the battery 48 may increase the amount of negative power a driver could demand before the friction braking system was engaged. This is illustrated in FIG. 7, where the first boundary 90 is at a higher (more negative) level of negative power demand than it is in FIG. 6. The state of charge of the battery 48 is just one factor that may define or partially define the position of the first boundary 90. The maximum amount of power that can be delivered to the battery before friction braking is engaged is indicated by the battery charge power limit, which itself is impacted by the state of charge, the temperature, and the age of the battery. In fact, depending on the vehicle operating and/or vehicle system conditions, one or both of the boundaries 90, 92 may change position on the visual indicator 84, and the overall size of the target range 88 may expand or contract.

To effect the appropriate displays on the information displays 64, 80, the VSC/PCM 54 may contain one or more algorithms to process inputs from the various vehicle systems with which it communicates, and then provide outputs to the information displays 64, 80. In one embodiment, VSC/PCM 54 may execute a method that includes the steps of determining one or more current operating conditions of the vehicle. These may include, for example, the state of charge of the battery 48, a discharge rate of the battery 48, and signals that are indicative of a driver demand, such as a power demand, a torque demand, or a position of the accelerator pedal 60. The VSC/PCM 54 may then determine a first driver demand threshold beyond which the engine will start. This is shown as the second boundary 78 in FIGS. 2-4, and the second boundary 92 in FIGS. 6-7. The VSC/PCM 54 can then send one or more signals to the information displays 64, 80 such that the second boundaries 78, 92 are displayed in the appropriate position.

Figure 5:
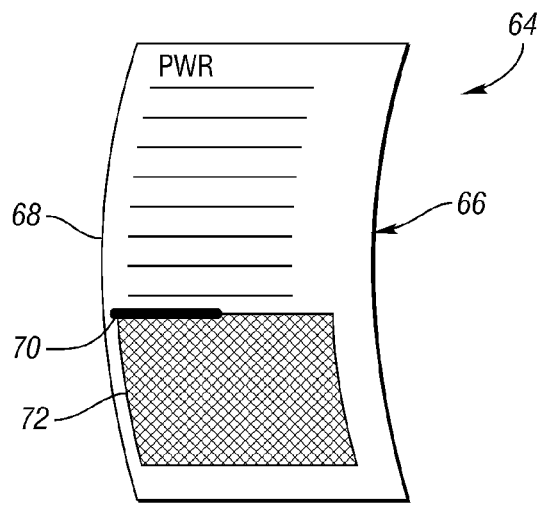
FIG. 5 shows the information display of FIG. 2 with the target range not displayed.
Figure 6:
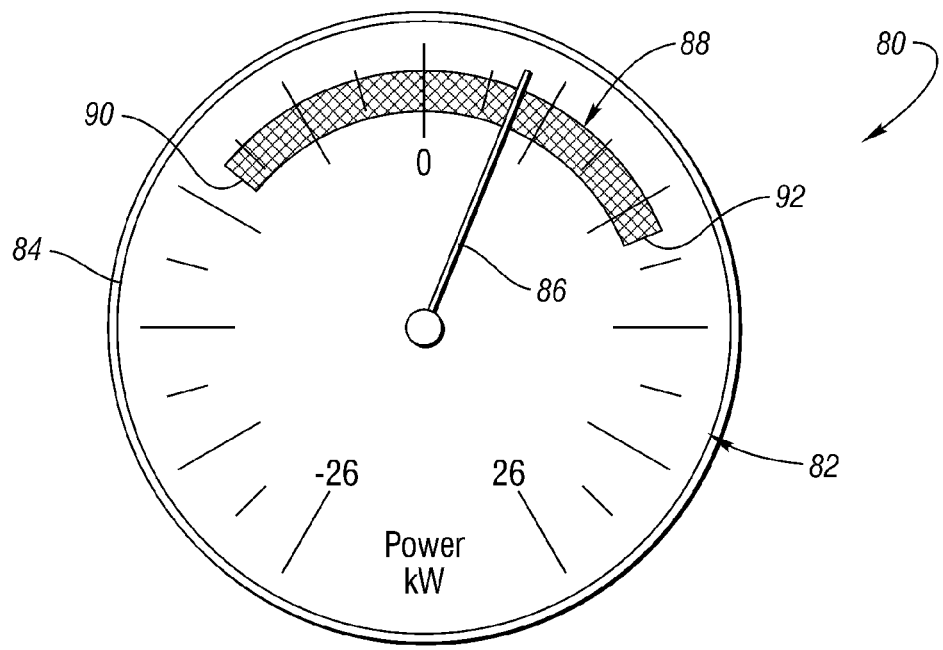
FIG. 6 shows an information display in accordance with another embodiment of the invention, including target ranges for positive and negative driver demand.
Figure 7:
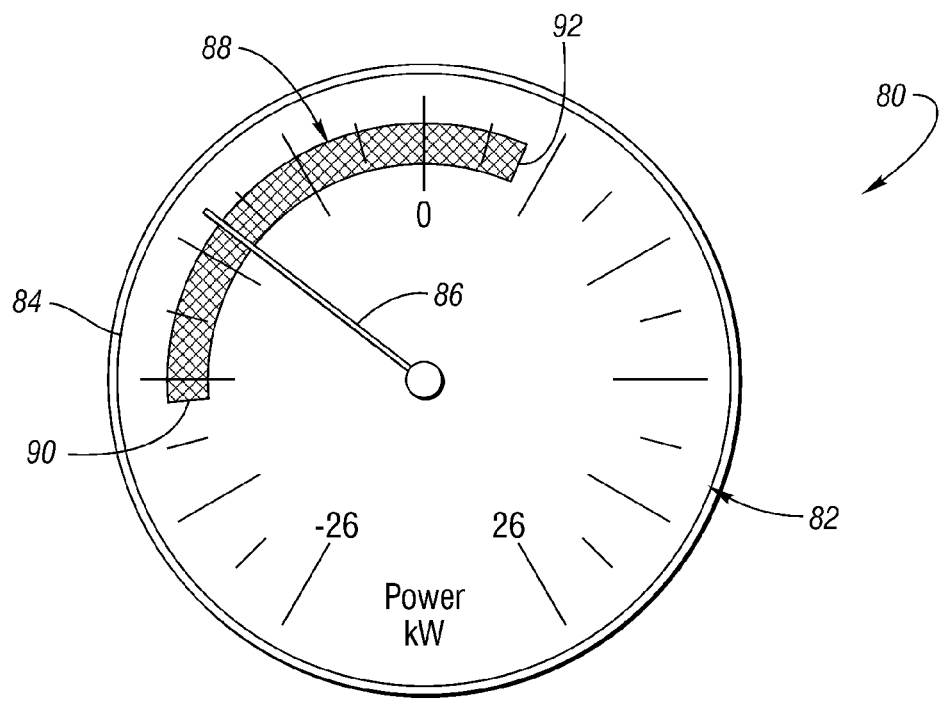
FIG. 7 shows the information display of FIG. 6 with both boundaries of the target range in different positions.

Because the VSC/PCM 54 will have also received inputs related to driver demand, the driver demand will be indicated, for example, as the bubble 70 in FIGS. 2-5, and the indicator 86 in FIGS. 6-7. In some cases, the current driver demand information is displayed relative to the target range so that the vehicle operator can see how his or her power demand affects operation of the vehicle. In particular, the driver can see how an increase or decrease in positive power demand can cause the engine to start or stop, and how an increase or decrease in negative power demand can cause the friction braking system to be engaged or disengaged. An exception to this occurs when the target range is not displayed, such as shown in FIG. 5, where the engine is running as a result of non-driver demand factors.

In FIGS. 6 and 7, the target range 88 may also not be displayed if the engine is on because of non-driver demand factors, such as operation of the air conditioning system 62. In addition, the target range 88 shown in FIGS. 6 and 7 may not be displayed if the friction braking system is engaged because of non-driver demand conditions. This could occur, for example, if the battery 48 has a very high state of charge, and could not accept regenerative braking energy. Showing the current level of driver demand relative to the target range provides information to the driver that allows him or her to take a proactive approach to operating the vehicle. Rather than learning that the engine has started after the driver demand has increased, the present invention provides a way for the driver to modify his or her behavior to keep the engine off in some situations, thereby increasing fuel economy.

While the best mode for carrying out the invention has been described in detail, those familiar with the art to which this invention relates will recognize various alternative designs and embodiments for practicing the invention as defined by the following claims.

What is claimed:

1. An information display for a vehicle including an engine and an electric machine, each operable to provide torque to propel the vehicle, the vehicle further including an electric power source configured to provide electric power to the electric machine, the information display comprising:

an indicator arrangement including a visual display configured to provide driver demand information to a driver of the vehicle, the visual display including a dynamic target range for operating the vehicle, the target range including a first boundary and a second boundary indicating a driver demand that would cause the engine to start; and a control system including at least one controller, the control system being configured to receive at least one input related to current operating conditions of the vehicle and to provide at least one output to the indicator arrangement to position the target range on the visual display and to indicate to the driver a current level of driver demand such that the visual display indicates to the driver the current level of driver demand relative to the position of the target range.

2. The information display of claim 1, the vehicle further including an accelerator pedal, and wherein the at least one input to the control system includes at least one of a state of charge of the electric power source or a discharge rate for the electric power source, and at least one of a driver demand for power, a driver demand for torque, or an accelerator pedal position.

3. The information display of claim 1, the vehicle further including an accelerator pedal, and wherein the driver demand information includes at least one of a driver demand for power, a driver demand for torque, or an accelerator pedal position.

4. The information display of claim 1, wherein the target range is not displayed on the visual display when the engine is on because of at least one non-driver demand factor.

5. The information display of claim 1, wherein the first boundary of the target range is fixed and the second boundary of the target range is movable based on current vehicle conditions.

6. The information display of claim 5, wherein the first boundary of the target range indicates zero driver demand.

7. The information display of claim 1, wherein the first and second boundaries of the target range are each movable based on current vehicle conditions.

8. The information display of claim 7, the vehicle further including a regenerative braking system and a friction braking system, and wherein the first boundary indicates a driver demand that would cause the friction braking system to be engaged.

9. An information display for a vehicle including an engine and an electric machine, each operable to provide torque to propel the vehicle, the vehicle further including an electric power source configured to provide electric power to the electric machine, the information display comprising:

an indicator arrangement including a visual display configured to provide information indicative of a driver demand for power, the visual display including a target range for operating the vehicle, the target range including a movable boundary indicating a driver demand that would cause the engine to start; and a control system including at least one controller, the control system being configured to receive at least one input related to current operating conditions of the vehicle and to provide at least one output to the indicator arrangement to position the movable boundary and a current level of driver demand on the visual display such that the position of the movable boundary relative to the current level of driver demand is observable.

10. The information display of claim 9, the vehicle further including an accelerator pedal, and wherein the movable boundary is positioned based on at least one of a state of charge of the electric power source or a discharge rate for the electric power source.

11. The information display of claim 9, the vehicle further including an accelerator pedal, and wherein the information indicative of a driver demand for power includes at least one of a driver demand for power, a driver demand for torque, or an accelerator pedal position.

12. The information display of claim 9, wherein the movable boundary is not displayed on the visual display when the engine is on because of at least one non-driver demand factor.

13. The information display of claim 9, wherein the current level of driver demand exceeds the movable boundary when the driver demand causes the engine to be on.

14. A method for providing information to a driver of a vehicle, the vehicle including an engine and an electric machine, each operable to provide torque to propel the vehicle, the vehicle further including an electric power source configured to provide electric power to the electric machine, an indicator arrangement including a visual display, and a control system including at least one controller, the method comprising:

determining at least one current operating condition of the vehicle and communicating the at least one current operating condition to the control system;

determining a first driver demand threshold beyond which the engine will start, the determination of the first driver demand threshold being performed by the control system and based on the at least one current operating condition;

displaying the first driver demand threshold on the visual display;

determining through the control system current driver demand information; and displaying the current driver demand information relative to the displayed first driver demand threshold on the visual display.

15. The method of claim 14, further comprising removing from the visual display the first driver demand threshold when the engine is on because of at least one non-driver demand factor.

16. The method of claim 14, the vehicle further including a regenerative braking system and a friction braking system, the method further comprising:

determining a second driver demand threshold beyond which the friction braking system will be engaged, the determination of the second driver demand threshold being performed by the control system and based on the at least one current operating condition; and displaying the second driver demand threshold relative to the current driver demand on the visual display.

* * * * *